(No Model.)

E. MURPHY.
KNIFE ATTACHMENT FOR PLOWS.

No. 511,636. Patented Dec. 26, 1893.

WITNESSES:
J. A. Bergstrom
C. Sedgwick

INVENTOR
E. Murphy
BY
Munn & Co.
ATTORNEYS.

United States Patent Office.

EDWARD MURPHY, OF YELLOW BUD, OHIO, ASSIGNOR TO HIMSELF AND FRANK KELLER, OF SAME PLACE.

KNIFE ATTACHMENT FOR PLOWS.

SPECIFICATION forming part of Letters Patent No. 511,636, dated December 26, 1893.

Application filed September 20, 1893. Serial No. 485,965. (No model.)

*To all whom it may concern:*

Be it known that I, EDWARD MURPHY, of Yellow Bud, in the county of Ross and State of Ohio, have invented a new and Improved Knife Attachment for Plows, to which the following is a full, clear, and exact description.

My invention relates to a plow attachment, and it has for its object to provide a knife capable of being attached to a plow beam in advance of the shovels, the knife being capable of being raised and lowered at will and held in either position.

The especial object of the invention is to so locate and shape the knife that in the cultivation of corn the knife will cut loose and in pieces pea vines, or vines of other character that may be twisted around the corn, the knives being adapted for attachment to either a single or a double beam plow.

The invention consists in the novel construction and combination of the several parts, as will be hereinafter fully set forth and pointed out in the claims.

Reference is to be had to the accompanying drawings forming a part of this specification, in which similar figures of reference indicate corresponding parts in all the views.

Figure 1:
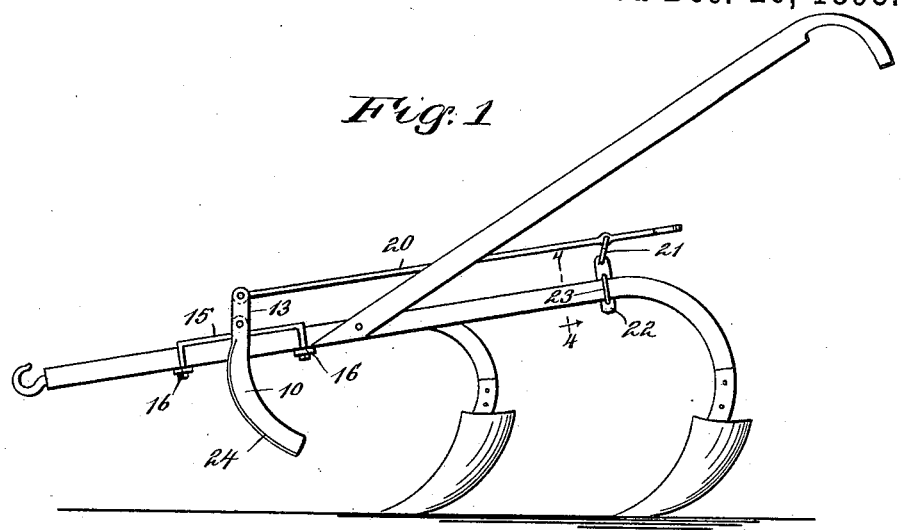
Figure 2:
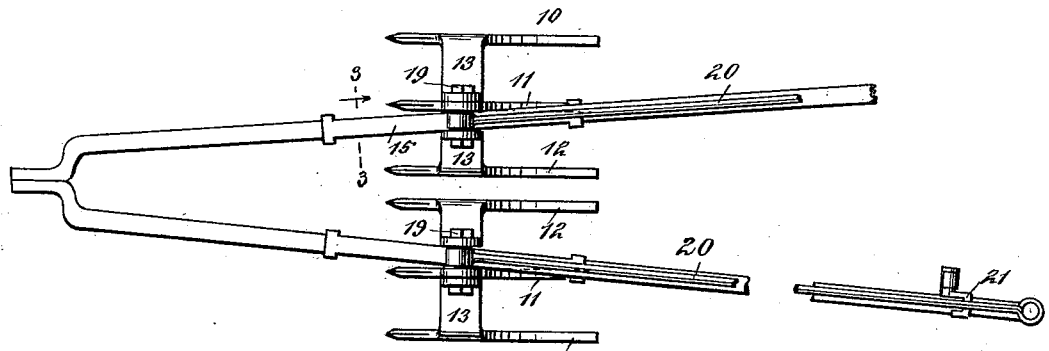
Figure 3:
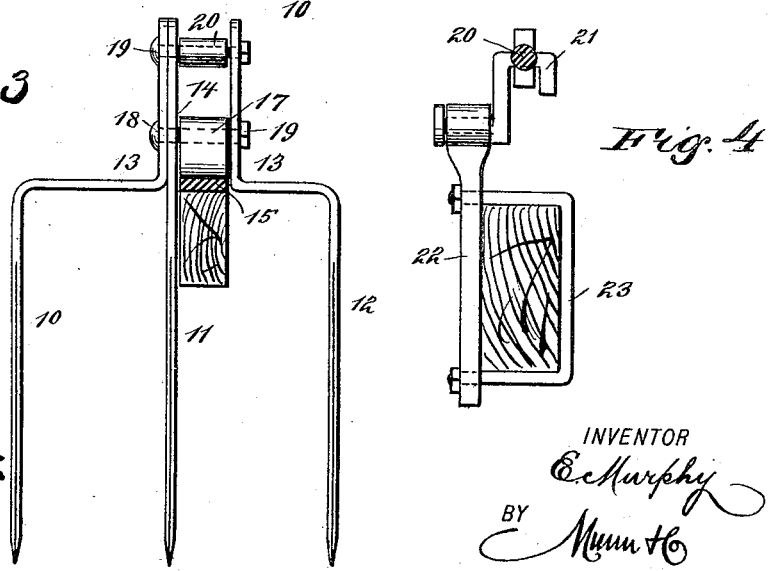
Figure 4:
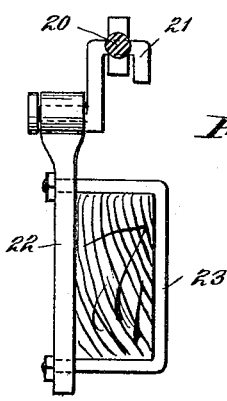

Figure 1 is a side elevation of a plow having the improvement applied thereto. Fig. 2 is a plan view thereof. Fig. 3 is a transverse section through one of the beams, taken practically on the line 3—3 of Fig. 2; and Fig. 4 is a like section taken essentially on the line 4—4 of Fig. 1.

In carrying out the invention each beam is adapted to carry three knives designated respectively as 10, 11 and 12, two of the knives 10 and 11 being located upon the outer side of the beam and the remaining knife upon the inner side. The two outer knives are provided with angular or substantially L-shaped shanks 13, while the intermediate knife is provided with a straight shank 14.

The knives proper, or their body portions, are curved from the top downward in direction of the shovels, and the knives are placed upon the beams preferably in the following manner: A plate 15, is secured longitudinally upon the upper surface of the beam by means of clips 16, or their equivalents, and an eye 17, is formed upon the plate at any desired point between its ends. The straight shank of the intermediate blade is placed in engagement with the vertical member of the angular shank of the blade that is to be at the outer side of the beam, and a bolt 18, is passed through suitable apertures made in these two shanks and through the eye 17 of the plate. The vertical member of the angular shank of the remaining blade is then placed in engagement with the opposite side of the eye, and the bolt 18 is passed through it and is provided with a suitable nut. In this manner the knives are held connectedly in groups of three and are pivoted upon the plate.

The upper ends of the shanks of the three knives are connected by a pin 19, or its equivalent; and a lever 20, is attached to the said pin 19. This lever is carried rearward either along a handle of the plow, or along the beam, as shown in Figs. 1 and 2, and is fulcrumed upon a crank arm 21, the said arm being pivoted in a bracket 22, secured firmly to the beam of the plow by a clip 23, or like fastening device. It will thus be observed that the lever has a rocking fulcrum, and that when the shanks, through the medium of the lever are placed at right angles to the plow beam, as shown in Fig. 1, the blades will be in cutting position, and the lever will be locked through the medium of the crank arm 21, and that if, for example, the lever is pushed forward, causing the knife shanks to lie approximately upon the beam, the knives will be thrown upward substantially to a horizontal position out of the way, the crank arm serving at this time also to lock the lever. The forward edges of the knives are their cutting edges, as shown at 24 in Fig. 1, and the cutting edges extend substantially the entire length of the body of the plate. With such a device attached to the cultivator or plow, when corn is under cultivation any vines that may cling to the corn stalks will be severed by the knives or cutters while the shovels are cultivating the roots.

Having thus described my invention, I claim as new and desire to secure by Letters Patent—

1. The combination with a plow beam, of knives pivoted thereto and a lever having its forward end connected with the shanks of the knives and its rear end fulcrumed on a rocking support, substantially as described.

2. A plow attachment, the same consisting of a gang of connected knives the forward edges of which are cutting edges, the knives being pivotally attached to the plow beam and curved downwardly and rearwardly therefrom, their forward edges being their cutting edges, and a lever connected with the gang of knives, and adapted to operate the same, the said lever having a rocking fulcrum, as and for the purpose set forth.

3. In a plow attachment, a gang of knives adapted to straddle the plow beam, the knives being connected at their shanks above the beam, their bodies or cutting surfaces being downwardly and rearwardly curved, the position of the knives being in advance of the shovels of the beam, a lever connected with the shanks of the knives, and a locking device connected with the lever, as and for the purpose set forth.

4. The combination with a plow beam, and knives pivoted thereto, of a bracket secured to the rear of the beam, a crank arm pivoted to the bracket, and a lever having its forward end connected with the shanks of the knives and its rear end fulcrumed on the said crank arm, substantially as herein shown and described.

EDWARD MURPHY.

Witnesses:
JOHN W. GOLDSBERRY,
JERRY M. LINIBECK.